United States Patent [19]
Stupp et al.

[11] Patent Number: 5,932,539
[45] Date of Patent: Aug. 3, 1999

[54] BIODEGRADABLE POLYMER MATRIX FOR TISSUE REPAIR

[75] Inventors: Samuel I. Stupp; Subramani Iyer, both of Champaign, Ill.

[73] Assignee: The Board of Trustees of the University of Illinois, Urbana, Ill.

[21] Appl. No.: 08/950,548

[22] Filed: Oct. 15, 1997

Related U.S. Application Data

[60] Provisional application No. 60/028,388, Oct. 15, 1996.

[51] Int. Cl.$^6$ .......................... C08G 63/48; C08G 63/91; C08L 89/00
[52] U.S. Cl. .................................. 514/2; 514/53; 514/57; 525/54.1; 525/54.11; 525/54.2; 525/54.3; 527/200; 527/207; 527/300; 527/311; 527/315
[58] Field of Search ..................................... 527/200, 207, 527/300, 311, 315; 525/54.1, 54.11, 54.2, 54.3; 514/2, 53, 57

[56] References Cited

U.S. PATENT DOCUMENTS

| | | | |
|---|---|---|---|
| 4,347,234 | 8/1982 | Wahlig et al. | 424/15 |
| 4,438,198 | 3/1984 | Schmer | 435/178 |
| 5,085,861 | 2/1992 | Gerhart et al. | 424/78.17 |
| 5,197,973 | 3/1993 | Pang et al. | 606/214 |
| 5,464,929 | 11/1995 | Bezwada et al. | 528/361 |
| 5,668,288 | 9/1997 | Storey et al. | 546/257 |

FOREIGN PATENT DOCUMENTS

| | | |
|---|---|---|
| 3-45265 | 2/1991 | Japan . |

OTHER PUBLICATIONS

S. Miyamoto and K. Takaoka, "Bone Induction And Bone Repair By Composites Of Bone Morphogenetic Protein And Biodegradable Synthetic Polymers", *Annales Chirurgiae et Gynaecologiae* 82:69–76, 1993.

Shimpei Miyamoto, et al., "Polylactic Acid–Polyethylene Glycol Block Copolymer", *Clinical Orthopaedics and Related Research*, No. 294, Sep. 1993, pp. 333–343.

J.O. Hollinger and G.C. Battistone, "Biodegradable Bone Repair Materials", *Clinical Orthopaedics and Related Research*, No. 207, Jun. 1986, pp. 290–305.

*Primary Examiner*—Frederick Krass
*Attorney, Agent, or Firm*—Barnes & Thornburg

[57] ABSTRACT

Novel biodegradable amphiphilic polymers are described. Preferred polymers have a lipophilic binding moiety coupled covalently to a hydrophilic tissue adhesion moiety through a divalent linker comprising a natural metabolite or a polymer biodegradable into a natural metabolite. In one embodiment the biodegradable polymers of the invention exhibit the property of self-assembly characteristic of liquid crystals. The present amphiphilic biodegradable polymers can be used alone or in combination with other biocompatible polymers, with cells, growth factors, hormones, and/or other pharmaceutical agents in fabrication of implantable matrices for tissue repair. The polymers are biodegradable into art-recognized biocompatible components, preferably natural metabolites.

11 Claims, 3 Drawing Sheets

BIODEGRADABLE POLYMER MATRIX FOR TISSUE REPAIR

The present invention is based on a provisional application, filed Oct. 15, 1996 and having U.S. Ser. No. 60/028,388, for which priority under 35 USC 119(e) is claimed.

FIELD OF THE INVENTION

This invention relates to biodegradable polymers for use in medical applications. More particularly, this invention is directed to novel biodegradable amphiphilic polymers, their preparation and their use in formulation of implant matrices for tissue treatment and repair. In preferred embodiments the present polymers exhibit the property of self-assembly characteristic of liquid crystals.

BACKGROUND AND SUMMARY OF THE INVENTION

Many polymers have been used in biomedical applications, including polyesters, polyvinylacetate, polyacrylates, polyorthoesters, poly(amino acids) and polyanhydrides. Biodegradable polymers, such as polyesters and polyanhydrides, particularly those that are biodegradable into natural metabolites, have been the subject of significant research efforts directed toward the development of new multifunctional polymer compositions for implant fabrication.

In accordance with the present invention, novel multifunctional biodegradable polymers are prepared for use in construction/formulation of implants useful for tissue treatment and repair. The biodegradable polymers are amphiphilic in that they include a natural hydrophobic or lipophilic group conjugated through a divalent linker, preferably a polymer biodegradable into natural metabolites, to a hydrophilic moiety which exhibits affinity for natural tissues. Preferred embodiments of the novel biodegradable polymers in accordance with this invention exhibit the property of self-assembly, detectable by x-ray detraction techniques, characteristic of art-recognized liquid crystal compositions.

The present biodegradable polymers can be used in formulating implant matrix compositions for tissue treatment and/or repair wherein the polymer provides a biodegradable carrier matrix for added biofunctional adjuvants. The implant matrix compositions can be in the form of a flowable viscous liquid or gel, a paste, a moldable putty, or a shape-retaining solid in molded form, depending on the molecular weight and chemical constituents of the component amphiphilic polymer(s). The cooperation of physical and chemical properties of the present amphiphilic biodegradable polymers work to produce a unique implant matrix functionality. The self-assembling character of preferred polymers in accordance with this invention can impart a unique matrix structure with localized ordered domains. That property, coupled with the unique molecular structure of the present biodegradable polymers, provides significant potential for fabrication of implants with improved functionality. Moreover, the liquid crystalline character of preferred biodegradable polymers in accordance with this invention enables the fabrication of implant matrix compositions that exhibit pre-determined temperature dependent order allowing, for example, the preparation of an implantable matrix composition that exhibits fluid (amorphous) properties at a temperature slightly above body temperature and solid properties at body temperature. An implant matrix composition so formulated can be injected into the locus of a tissue defect as a liquid and thereafter solidify with phase transition to a microcrystalline or liquid crystalline form at body temperature.

The present novel biodegradable polymers, when used in implant matrix compositions degrade (hydrolyze) with time after implantation, thereby providing a temporary template for cell (of endogenous or exogenous origin) growth and release of other contained bioactive adjuvants, if any, to the locus of the implant. When used for tissue repair the implant matrix is gradually replaced by endogenous tissue in repair of a targeted tissue defect.

Preferred polyesters in accordance with this invention are prepared by using a lipophilic alcohol or amine (or, for example, a lipohilic acid esterified with a diol to present alcohol functionality) to initiate polymerization of one or more cyclic esters of hydroxy acids, and thereafter covalently linking the resulting polyester conjugate to a polyionic organic group, preferably a polyionic polysaccharide or a polyionic poly(amino acid), optionally through a diacid, diol, hydroxy acid or amino acid linker.

DETAILED DESCRIPTION OF THE INVENTION

This invention is directed to the use and preparation of novel biodegradable polymers that can be used alone or in combination with other polymers for fabrication of improved matrix compositions for tissue repair and/or prolonged release of biologically active compounds. The biodegradable polymer compounds in accordance with this invention can be described more particularly as polymer conjugates, actually bis-conjugated polymers wherein a divalent biodegradable polymer is conjugated at one terminus with a naturally occurring lipophilic organic functional group that exhibits affinity for cell membranes, and conjugated at the other terminus (of the divalent polymer molecule) with a polyionic organic group that exhibits affinity for naturally occurring tissues, more particularly the naturally occurring polymers of extracellular matrices.

Thus, in accordance with this invention there is provided a biodegradable polymer of the general formula $$L_a P_b T$$

wherein L is a lipophilic membrane binding moiety derived from a naturally occurring compound, P is a divalent linker comprising a natural metabolite or a polymer biodegradable into natural metabolites, T is a hydrophilic tissue adhesion moiety selected from polyionic poly(amino acids) and polyionic polysaccharides, and each independently represent a direct bond or a bond through a biocompatible divalent linker.

The terminology "lipophilic membrane binding moiety derived from a naturally occurring compound" refers to organic groups, most typically hydrocarbon groups having from about 10 to about 40 carbon atoms, which groups due to their structure and composition exhibit lipid-like or lipophilic character, and which form substantially all or some part of the structural formula of a naturally occurring compound. Exemplary of naturally occurring compounds from which such lipophilic organic groups can be derived include fatty acids, fatty alcohols, cholesterol, monoglycerides, diglycerides, phospholipids, cephalins, glycolipids, cerebrosides, cardiolipin, sphingomyelin, and art-recognized membrane binding peptides such as the 30 amino acid amphipathic peptide "P100" described by Subbarao et al. in *Biophysical Journal*, 49, 134A (1986).

In the above formula, the divalent group P comprises a natural metabolite or a polymer biodegradable into natural metabolites. In one embodiment of the present invention P is a polyester comprising a homopolymer, copolymer, or terpolymer of hydroxyacids, for example, lactic acid, glycolic acid, $\beta$-hydroxy caproic acid and $\beta$-hydroxyvaleric acid. Alternatively the polyester linker can be formed using copolymerization of a biocompatible polyhydric alcohol, such as propylene glycol, and a biocompatible polycarboxylic acid including, for example, Kreb's cycle intermediates such as citric, isocitric, cis-aconitic, $\beta$-ketoglutaric, succinic, maleic, oxaloacetic and fumaric acid. The hydroxy acid derived divalent polyester linkers (-P-) can have from 1 to about 50, more preferably 2 to about 20 component hydroxy acid units in the polymer chain. The number of units and thus the aggregate weight of the polymer molecule can be selected to provide a targeted physiochemical characteristic such as viscosity or in the case of the preferred polymers of this invention, exhibiting the characteristic of self-ordering or self-assembling, the phase transition temperature of the product biodegradable polymer. That is true as well where the divalent linker P is a biodegradable polymer other than a polyester, for example, a peptide or a polypeptide wherein the number and type of the component amino acid groups can be selected to adjust the physio-chemical characteristics of the end product biodegradable polymer compounds.

The group T in the above formula representing the biodegradable polymers of the present invention is a hydrophilic tissue adhesion moiety, typically a polyionic organic group which exhibits good compatibility and concomitant affinity for tissue structures in vivo, more particularly the naturally occurring polymers which constitute the acellular components of tissue such as collagens, glycoproteins, proteoglycans, and glycosaminoglycans.

Preferred hydrophilic tissue adhesion moieties represented by the group T in the above formula are polyionic poly(amino acids) and polyionic polysaccharides. Suitable polyionic polyamino acids exhibiting affinity to tissues in vivo are described and claimed in U.S. application Ser. No. 08/633,118 filed Apr. 16, 1996, now U.S. Pat. No. 5,733,868 titled "Poly(Amino Acid) Tissue Grafts", the disclosure of which is expressly incorporated herein by reference. Suitable polyamino acids include poly L-glutamic acid, poly L-aspartic acid, poly-L-lysine, poly L-glutamine and poly L-asparagine and as well other polypeptides wherein more than about 50% of the amino acid residues are selected from the group consisting of L-glutamic acid, L-glutamine, L-aspartic acid, L-asparagine and L-lysine. The polyamino acids can have a molecular weight of about 300 to about 100,000, more typically about 1,000 to about 50,000.

Suitable polyionic polysaccharides for use in forming the portion of the biodegradable polymers of the present invention represented by the group T include alginates and carboxymethylcellulose and chondroitin sulfate and other natural polyionic glycosaminoglycans. One group hydrophilic tissue adhesion moieties represented by the group T for use in forming the biodegradable polymers of the present invention is lysine or polylysine having about 2 to about 50 lysine units, more typically about 5 to about 20 lysine units. Alternatively group T can include both polyionic polysaccharide and polyionic polyamino acid groups in tandem.

The representations $$\overline{a} \text{ and } \overline{b}$$

in the above formula for the biodegradable polymers of this invention each independently represents a direct bond or a bond through a biocompatible divalent linker. Each bond independently can be covalent, ionic or a hydrogen bond. Most typically $$\overline{a} \text{ and } \overline{b}$$

represent a direct covalent bond or a covalent bond, for example, an ester or an amide linkage, through a biocompatible divalent linker. The term "biocompatible divalent linker" as used in defining this invention refers to any biocompatible difunctional compound wherein each functional group can be used in an ester-forming or amide-forming bond with the terminus of the adjacent portion of the polymer molecule. Exemplary of biocompatible difunctional compounds are diacids, diols, hydroxy acids, and amino acids. Aromatic hydroxy acids, such as p-hydroxybenzoic acid and o-hydroxybenzoic acid, and aromatic amino acids, such as p-aminobenzoic acid, are particularly suitable as divalent linkers. The linkers can be used to facilitate covalent coupling of the component groups L, P and T of the present biodegradable polymer compounds through ester and amide bond formation using art-recognized acid activation/coupling techniques.

Figure 1:
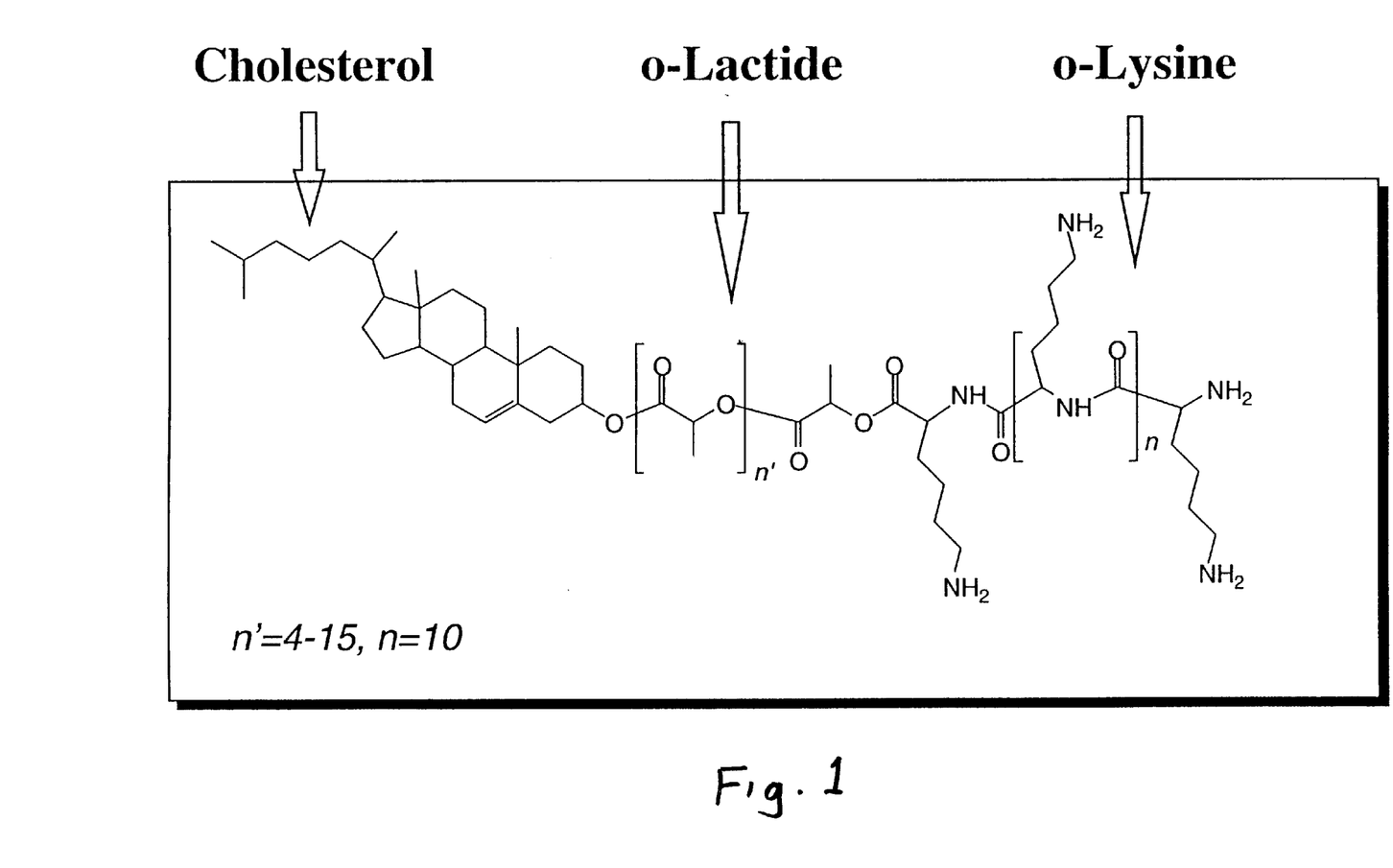
FIG. 1 illustrates the chemical formula of a subset of biodegradable polymers in accordance with this invention.

In one embodiment representing a subset of the present invention there is provided a biodegradable polymer of the formula $$L_{\overline{a}}P_{\overline{b}}$$

wherein L is as defined above, P is the divalent residue of a polyester, said polyester comprising a homopolymer, copolymer or terpolymer of a biocompatible hydroxy acid metabolite, H is a polyionic polyamino acid, $$\overline{a}$$

is a direct covalent bond and $$\overline{b}$$

represents a direct covalent bond or a covalent bond through a divalent linker selected from biocompatible hydroxy acids or amino acids. Exemplary of a biodegradable polymer within that embodiment of this invention is the biodegradable polymer represented by the structure in FIG. 1. With reference to the above formula, in the structure of FIG. 1, L is the group cholesterolyl (derived from cholesterol), P is a polylactide having a degree of polymerization of about 5 to about 30, and T is a polylysine covalently bonded to the hydroxy terminus of the polylactide through an ester linkage.

Figure 2:
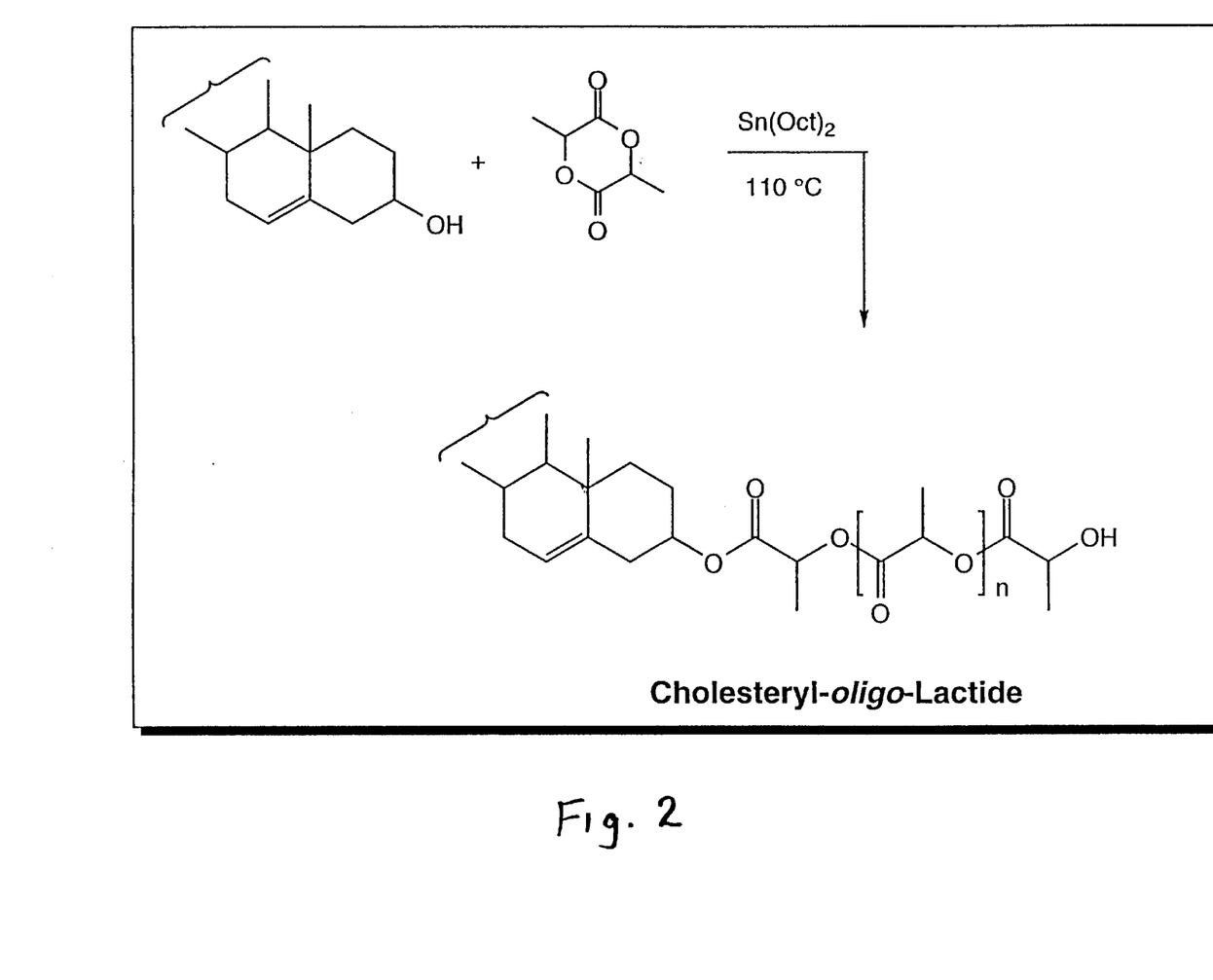
FIG. 2 illustrates the synthesis of cholesteroyl-oligolactide, a self-assembling polyester conjugate utilized as an intermediate in preparation of the biodegradable polymers of this invention.

There is also provided in accordance with this invention a method of preparing a biodegradable polymer of the formula $$L_{\overline{a}}P_{\overline{b}}$$

wherein L is as defined above, P is the divalent residue of a polyester, said polyester comprising a homopolymer, copolymer or terpolymer of a biocompatible hydroxyacid metabolite, T is a polyionic polyamino acid, $\overline{a}$ is a direct covalent bond and $\overline{b}$ represents a direct covalent bond or a covalent bond through a divalent linker selected from biocompatible hydroxy acids or amino acids. The method comprises the steps of reacting a compound of the formula LOH (or LNH$_2$) with a cyclic hydroxy acid ester to form an intermediate polyester conjugate of the formula $$L_aP(OH)$$

wherein L, $\overline{a}$ and P are as defined above. That step is conducted at elevated temperature neat in the presence of stannous octoate or in solution with an equivalent amount of triethyl aluminum. The number of hydroxy acid units in the polyester portion of the intermediate polyester conjugate can be controlled by adjusting the stoichiometry of the polymerization reaction with the average number of hydroxyacid units in the polyester increasing with each molar excess of the cyclic hydroxy acid ester reactant. One example of this reaction step is illustrated in FIG. 2.

Figure 3:
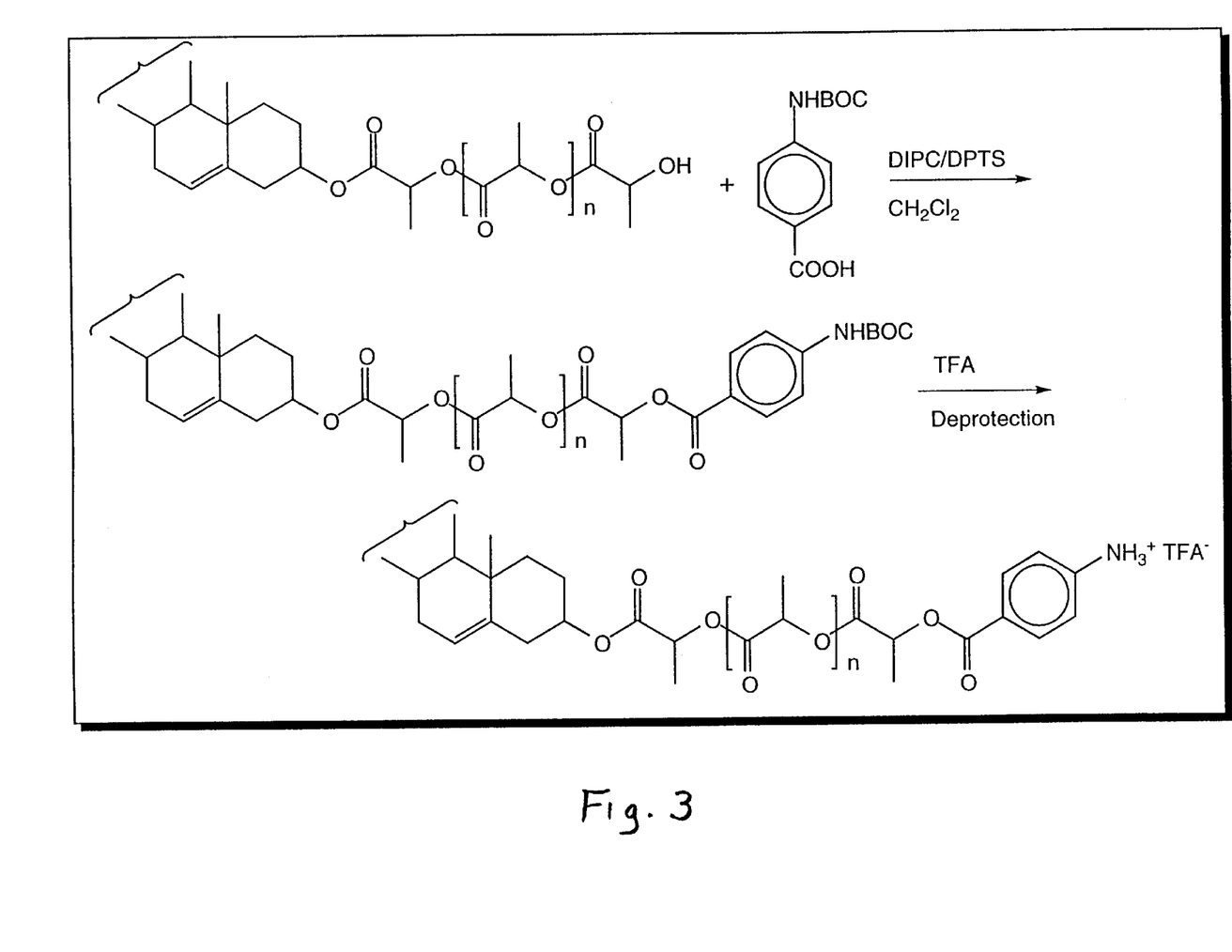
FIG. 3 illustrates the covalent coupling of the polyester conjugate shown in FIG. 2 with 4-butyloxycarbonyl (BOC) aminobenzoic acid with subsequent removal of the BOC amine protecting group with trifluoroacetic acid.

The resulting hydroxy terminated polyester conjugate is optionally used to esterify an amino-protected amino acid or a hydroxy-protected hydroxy acid with subsequent deprotection of resulting product to provide a compound of the formula $$L_aP'NH_2$$

or $$L_aP'OH$$

wherein P' designates the terminally esterified moiety. One example of this reaction step is illustrated in FIG. 3.

The nature of the protecting group utilized is not critical. Any art-recognized hydroxy or amino protecting group can be used to protect the nucleophilic amino or hydroxy functionality during the ester-forming step and thereafter removed by selective reaction conditions which do not affect the integrity of the rest of the molecule. Hydroxy and amino protecting groups, as well as carboxy protecting groups, and their use and removal in organic synthesis is well known in the art.

In the next step of the synthesis of the present biodegradable polymers, the hydroxy terminated polyester conjugate, with or without the optional amino acid or hydroxy acid linking moiety, is reacted with an ester-forming derivative of an amino acid or poly(amino acid) of the formula $$HOOCCHZNH[COCHZNH]_nP_r$$

wherein N is 0 to 50, $P_r$ is an amino-protecting group, and Z is selected from the group consisting of protected carboxymethyl, protected 2-carboxyethyl, protected 4-aminobutyl, carbamidomethyl and 2-carbamidoethyl to form a compound of the formula $$L_aP_bT(protected)$$

and thereafter reacting that product to remove the protecting group(s). Again, the nature of the protecting groups is not critical. Their selection is based simply on ease of application and removal without disrupting the remainder of the molecule. Thus, for example, a biodegradable polyester in accordance with this invention is prepared by reacting a cholesterolyl polylactide conjugate with an ester-forming polyamino acid derivative formed by the reaction of N-protected lysine or poly(N-protected lysine) with a dialkylcarbodiimide. Alternatively the ester-forming derivative of the amino acid is N-(protected)lysine N-carboxyanhydride which when reacted with the polyester conjugate of the formula $$L_aP(OH)$$

or the terminally esterified polyester conjugates of the formula $$L_aP'NH_2$$

or $$L_aP'OH$$

provide a compound of the formula $$L_aP_b\text{-COCH}(CH_2CH_2CH_2CH_2NHP_r)NH_2$$

wherein $P_r$ is an amino protecting group. That product can optionally be reacted with an additional 1 to 50 molar equivalents of N-(protected)lysine N-carboxyanhydride, and deprotecting the resulting product to form a compound of the present invention of the formula $$L_aP_bT$$

wherein T is polylysine.

In one preferred embodiment of the present invention the biodegradable polymers exhibit the characteristic of self-assembly characteristic of liquid crystals. The phase transition temperature between liquid and crystalline form varies, of course, with molecular weight and the nature of each of the component portions L, P, and T of the polymer molecules. The present biodegradable molecules can have a weight average or number average molecular weight from about 650 to about 150,000, more typically about 1,000 to about 120,000. Liquid crystalline or microcrystalline forms of the present biodegradable polymers can be prepared, for example, by thermal cycling between temperatures above and below the liquid crystal phase transition temperature or by precipitation/crystallization from solvents, preferably biocompatible solvents, or biocompatible solvent mixtures.

The biodegradable polymers in accordance with this invention can be used alone or as a component of an implant matrix composition for tissue treatment and/or repair. The implant matrix composition can include an effective amount of a biofunctional adjuvant appropriate to the treatment or repair needs of the targeted tissue. Thus for example the biodegradable polymer of this invention can be combined with viable cells, such as chondrocytes, to serve as a temporary matrix for cell growth and concomitant tissue regeneration at the site of implant. The biodegradable polymers provide a natural surfactant or tissue wetting/adhesive function, the molecules each having both a tissue adhesion moiety and a lipophilic membrane binding moiety for localizing cell populations. It is believed that the natural ordered arrangement of the present self-assembling molecules provide a natural ordered array for cell growth and tissue regeneration at the implant site.

The present implant matrix compositions can include the present biodegradable polymer and a biofunctional adjuvant selected from the group consisting of growth factors, enzymes, hormones, nucleic acids, and pharmaceutical agents. The term "pharmaceutical agents" includes any commercially available compound having art-recognized biological activity and used for therapeutic use in humans or animals. The biodegradable polymer, alone or in combination with biofunctional adjuvants blended with the polymer as a melt or as a polymer solution and subsequently co-precipitated with the polymer to form implant matrix compositions, can be used to repair damaged or diseased tissue or to simply provide a source for prolonged release of controlled amounts of contained bioactive/biofunctional adjuvants. Each implant composition can, depending on its intended use, be formulated as a shape-retaining solid, either molded or moldable to a shape suitable for contact with the damaged or diseased tissue, or it can be in the form of a paste or putty which can be pressed into the tissue defect site by surgeon at the time of implant to take the shape of the defect. Alternatively the implant composition can be prepared in the form of an injectable gel or liquid having a phase transition temperature such that it can be injected as a liquid or a gel above body temperature, but undergoes phase change to crystalline or semi-crystalline form at body temperature.

It is contemplated that the amphiphilic character of the biodegradable polymers of this invention will allow those compounds to find use in many applications other than the above-described use as implant matrices. Thus, for example, they should have surfactant-like functionalities and find use as such in many applications such as physiological emulsions, for example, synthetic blood formulations or parenteral nutrient formulations, compatibilizing agents for polymer blends, solubilizer/stabilizer for pharmaceutical/drug formulations, wetting agents for degradable devices, lubricants for cannulas, bioadhesives, and stabilizers for injectable foams and gels. The unique combination of properties, i.e. biodegradability and self-assembly, enable the present compounds to be considered for a wide variety of applications in the areas of medical, chemical and biological applied sciences.

EXAMPLES

General:

L-Lactide was recrystallized twice from dry ethyl acetate. Cholesterol was recrystallized from hot ethanol. Triethyl aluminum and Stannous octoate were purchased from Aldrich Chemical Co. 4-(BOC)aminobenzoic acid and 4-(BOC)-hydroxybenzoic acid were synthesized from 4-aminobenzoic acid and 4-hydroxybenzoic acid respectively, by standard procedures. N,N-Dicarboxybenzyloxy lysine was purchased from Sigma Chemical Company.

Abbreviations: DCC (dicyclohexyl carbodiimide), DPTS (1:1 complex of 4-dimethylaminopyridine and p-toluenesulfonic acid), DMAP (4-dimethylaminopyridine), BOC (butyloxycarbonyl), Z (carbobenzyloxy).

Synthesis of I

Cholesterolyl-(lactide)$_n$

To a stirred solution of cholesterol (1 mmol) in dry toluene (20 mL) was added triethyl aluminum (1 mm, 1.9M in toluene) and the reaction mixture stirred at 40° C. for 30 min. The entire reaction mixture was transferred to a Schlenk flask containing recrystallized L-Lactide (5 mmol) dissolved in toluene (20 mL). The temperature of the reaction mixture was raised to 70° C. and stirred at this temperature for 3 days. After completion of the reaction, the flask was cooled to room temperature and water (20 mL) was added to quench the polymerization reaction. The products were extracted with dichloromethane (3×20 mL), washed with 1M HCL (20 mL), water (2×20 mL) and the dichloromethane layer was dried with sodium sulfate. The volatile organics were removed by rotary evaporation to provide I in 89% yield.

Note 1: An alternative procedure involves the addition of triethyl aluminum directly to a solution of L-Lactide (10 mmol) and cholesterol (1 mmol) and stirring the reaction at 40° C. for 30 min. and raising the temperature of the reaction mixture to 70° C.

Note 2: The length of the oligo-lactide unit depends on the ratio of L-Lactide to cholesterol.

Note 3: Higher oligomers of cholesterolyl-lactide can be easily separated by precipitation of the products in methanol. After completion of the reaction, using the procedure detailed above, the reaction mixture is stripped of toluene and dissolved in dichloromethane (5 mL). This dichloromethane extract is added dropwise to a well-stirred solution of methanol (100 mL) and the product is collected as a white solid after centrifugation.

I: $^1$H NMR (CDCl$_3$, ppm) ƀ5.34 (d, 1 H), 5.0–5.2 (m, 9 H), 4.65 (m, 1 H), 4.34 (q, 1 H), 1.0–2.0 (m), 0.7 (s, 3 H).

Synthesis of I using Stannous Octoate:

To a well dried Schlenk flask was added L-Lactide (10 mmol) and cholesterol (1 mmol) and the flask evacuated and purged with nitrogen repeatedly. Stannous Octoate (1 mmol) was injected in the reaction mixture and the reaction mixture evacuated to 0.01 mm Hg. The reaction flask was sealed, completely immersed in an oil-bath and heated to 110° C. for 6 h. After completion of the reaction, the reaction.flask was cooled to room temperature, filled with nitrogen and dichloromethane (15 mL) was added. The product I was precipitated by dropwise addition of the dichloromethane extract in methanol (100 mL) in 94% yield.

I: $^1$H NMR (CDCl$_3$, ppm) δ5.34 (d, 1 H), 5.0–5.2 (m, 27 H), 4.65 (m, 1 H), 4.34 (q, 1 H), 1.0–2.0 (m), 0.7 (s, 3 H).

Synthesis of II

Cholesterolyl-(lactide)$_n$-p-aminobenzoate

To a stirred solution of I (~1 mmol), p-(BOC)-aminobenzoic acid (1.2 mmol) and DPTS (1.2 mmol) in dichloromethane (20 mL), was added di-isopropyl carbodiimide (1.2 mmol) and the reaction mixture stirred overnight. After completion of the reaction, the reaction mixture was concentrated and the product was obtained by precipitation in methanol (50 mL) in quantitative yields. The product was redissolved in dichloromethane (15 mL) and 50% trifluoroacetic acid (15 mL) in dichloromethane added and the reaction mixture was stirred for 4 h. The reaction mixture was stripped of solvents and the viscous solution was added dropwise into methanol (50 mL) to provide II in 90% overall yield.

II: $^1$H NMR (CDCl$_3$, ppm) δ7.85 (d, 2 H), 6.6 (d, 2 H), 5.34 (m, 2 H), 5.0–5.2 (m, 27 H), 4.65 (m, 1 H), 1.0–2.0 (m), 0.7 (s, 3 H).

Synthesis of III

Cholesterolyl-(lactide)$_n$-p-hydroxybenzoate

Identical procedure as for the synthesis of II was followed except p-(BOC)-hydroxybenzoic acid was used.

III: $^1$H NMR (CDCl$_3$, ppm) δ8.15 (d, 2 H), 7.24 (d, 2H), 5.34 (m, 2 H), 5.0–5.2 28 H), (m, 28 H) 4.65 (m, 1 H), 1.0–2.0 (m), 0.7 (s, 3 H).

Synthesis of IV

Cholesterolyl-(lactide)$_n$-p-(N, N'-dicarbobenzyloxylysine) amidobenzoate

To a well stirred solution of II (0.25 mmol), DMAP (1 mmol), N, N'-dicarbobenzyloxy lysine (1 mmol) in dichloromethane (20 mL), cooled to 0° C., was added DCC (1 mmol) in three portions. The reaction mixture was brought to room temperature and stirred overnight. The product IV was isolated by concentration of the reaction mixture, and precipitation in methanol (50 mL). The yields were quantitative.

IV: $^1$H NMR (CDCl$_3$, ppm) þ8.0 (d, 2 H), 7.6 (d, 2 H), 7.25–7.3 (m, 10 H), 5.34 (m, 2 H), 5.0–5.2 (m, 28 H), 4.0 (d, 1 H), 3.4 (m, 1 H), 3.0–3.2 (m, 3 H), 2.2 (d, 1 H), 1.0–2.0 (m), 0.7 (s, 3 H).

Synthesis of V

Cholesterolyl-(caprolactone)$_n$

To a solution of cholesterol (1 mmol) and caprolactone (10 mmol) in toluene (20 mL) was added triethyl aluminum (1 mmol) and the reaction mixture stirred at 70° C. for 6 h. After completion of the reaction, the reaction mixture was cooled to room temperature and diluted with dichloromethane (20 mL). The products were washed with water (20 mL), 1M HCL (20 mL) and finally with water (20 mL). The organic extract was dried with sodium sulfate and the volatiles removed by rotary evaporation to provide V in 85% yield.

V: $^1$H NMR (CDCl$_3$, ppm) þ5.3 (d, 1 H), 4.0–4.2 (m, 26 H), 3.61 (t, 2 H), 2.2–2.4 (m, 38 H), 0.8–1.8 (m), 0.7 (s, 3 H)

We claim:

1. A biodegradable polymer of the general formula $L_a P_b T$ wherein L is a lipophilic moiety having from about 10 to about 40 carbon atoms, or L is a lipophilic, amphipathic peptide moiety, P is a divalent linker comprising a natural metabolite or a polymer biodegradable into natural metabolites, T is a polyionic organic group selected from the group consisting of polyionic poly(amino acids) and polyionic polysaccharides, $a$ and $b$ each independently represents a direct bond or a bond through a biocompatible divalent linker, and wherein the polymer is capable of solidifying after injection into the locus of a tissue defect with phase transition to a microcrystalline or liquid crystalline form at body temperature.

2. The polymer of claim 1 wherein the lipophilic moiety, L, is selected from the group consisting of fatty acids, fatty alcohols, cholesterol, mono-glycerides, diglycerides, phospholipids, cephalins, glycolipids, cerebrosides, cardiolipin, and sphingomyelin.

3. The polymer of claim 1 wherein $a$ and $b$ each independently represent a covalent bond or a biocompatible divalent linker selected from the group consisting of biocompatible diacids, diols, hydroxy acids and amino acids.

4. The biodegradable polymer of claim 1 wherein P is a polyester.

5. The biodegradable polymer of claim 4 wherein the polyester is a homopolymer, copolymer, or terpolymer of biocompatible hydroxy acid or acids.

6. The biodegradable polymer of claim 4 wherein the polyester is polylactic acid.

7. The biodegradable polymer of claim 1 wherein T is a polyionic polysaccharide.

8. The biodegradable polymer of claim 1 wherein T is a polyionic poly(amino acid).

9. The biodegradable polymer of claim 8 wherein P is a polyester.

10. The biodegradable polymer of claim 9 wherein L is cholesterolyl.

11. The biodegradable polymer of claim 10 wherein $\overline{a}$ is a direct bond and $\overline{b}$ is a bond through a biocompatible hydroxy acid or amino acid linker.

\* \* \* \* \*